E. RABA.
COMBINED GASKET AND OIL GASIFIER.
APPLICATION FILED JULY 11, 1919.

1,329,343.

Patented Jan. 27, 1920.

Inventor
Ernest Raba
By A. P. Greely
Attorney

UNITED STATES PATENT OFFICE.

ERNEST RABA, OF VALLEY, OKLAHOMA.

COMBINED GASKET AND OIL-GASIFIER.

1,329,343.  Specification of Letters Patent.  Patented Jan. 27, 1920.

Application filed July 11, 1919. Serial No. 310,198.

*To all whom it may concern:*

Be it known that I, ERNEST RABA, a citizen of the United States, residing at Valley, in the county of Pawnee, State of Oklahoma, have invented certain new and useful Improvements in Combined Gaskets and Oil-Gasifiers, of which the following is a description, reference being had to the accompanying drawings, forming a part hereof.

My invention relates to explosion engines of the internal vaporizing type in which oil heavier than gasolene is converted into gas within the cylinder or combustion chamber, and has for its object to provide improved means for thus converting oil into gas which will be simple in construction, relatively inexpensive, efficient in operation and will be adapted to be placed in position for use without changing the construction of the engine in any respect. A further object of the invention is to provide gasifying means for the purpose above described which will be carried by a plate which will take the place of and serve the purpose of the gasket commonly used between the cylinder body and cylinder head in explosion engines in which the head is removable.

With the above described objects and other objects hereinafter explained in view my invention consists in the construction and combination of elements hereinafter described and claimed.

Referring to the drawings;

Fig. 5 is a detail vertical sectional view on an enlarged scale on a plane passing through the inlet and exhaust ports at right angles to the plane on which Fig. 1 is taken.

Figure 1:
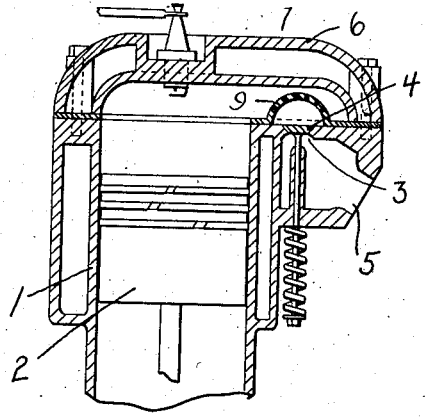
Figure 1 is a central vertical sectional view of an explosion engine cylinder equipped with a gasifying device embodying my invention.
Figure 2:
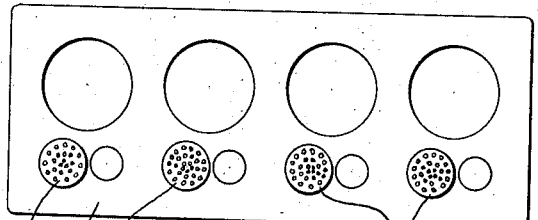
Fig. 2 is a plan view of a gasifying device embodying my invention adapted to serve as the gasket between a cylinder body having a plurality of cylinders formed in it, and a head plate adapted to close the ends of all the cylinders.
Figure 3:
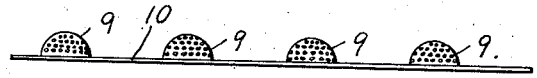
Fig. 3 is an edge view of the device shown in Fig. 3.
Figure 4:
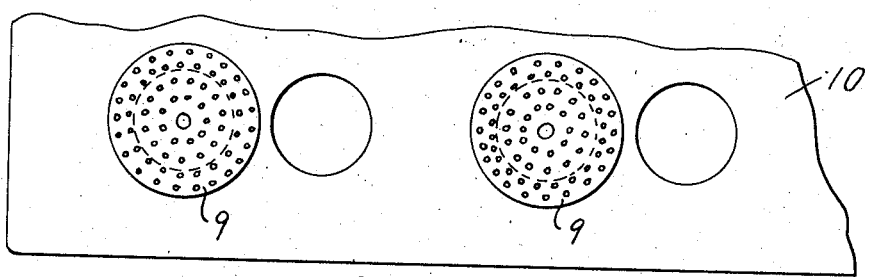
Fig. 4 is a top plan view of the gasifying device on an enlarged scale.

In the drawings 1 indicates the cylinder of an explosion engine having piston 2 and having inlet port 3 controlled by valve 4 formed in the cylinder body, valve 4 being arranged to move in a line parallel with the axis of the cylinder. 5 indicates the opening in the valve chamber of the inlet valve 3 through which oil and air is supplied by means of an oil supply pipe (not shown) leading from the usual carbureter. 6 indicates the cylinder head having a recess 7 formed in it in line with the bore of the cylinder adapted to act as a combustion chamber this recess being of such shape and size as to extend over the inlet port 3 and the exhaust port 8 which in the construction shown is also formed in the cylinder body. The cylinder body as shown is that of the engine of the well known Ford automobile and consists of a casting having four cylinders formed in it each with its inlet and exhaust port all of the cylinders being arranged to be closed by a single end plate having a plurality of recesses formed therein, one for each cylinder, to serve as combustion chambers. This end plate is, in the ordinary construction of the engine of the Ford automobile, bolted to the cylinder body with a copper gasket between it and the cylinder body, the gasket having suitable openings formed in it corresponding to the cylinder bores and the inlet and exhaust ports.

9 indicates the gasifying device. This consists of a plate of sheet metal, preferably of copper, dished as shown and perforated with a number of holes for the passage of the oil or oil vapor, and arranged over the inlet port with its concavity downward. This gasifying device is preferably formed in one piece with the gasket and may be formed from a sheet of copper of the same shape and size from which the gasket would be formed the portion which would ordinarily be cut out for the inlet port being perforated and drawn or beaten into the dished form shown. This plate or sheet having the gasifying device 9 thus formed integral with the portion which serves as the gasket may be readily substituted for the ordinary gasket without any change in either the cylinder body or the end plate and if for any reason it is desired to dispense with the gasifying device as might be the case if it is desired to run the engine with gasolene instead of heavy oil, it is only necessary to take off the end plate, remove the sheet or plate with the gasifying device and put in its place the ordinary gasket.

Figure 5:
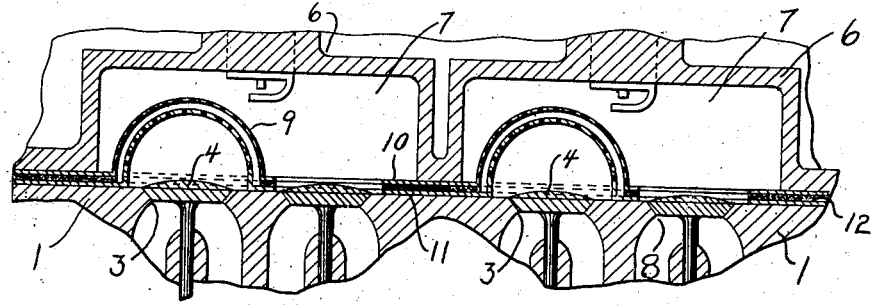

The sheet or plate carrying the gasifying device is preferably formed of two sheets of copper with a sheet of fiber between them as shown in Fig. 5, the outer sheet being shown at 10, the inner or lower sheet being shown at 11 and the interposed fiber sheet being shown at 12. The fiber sheet is, of course, cut out between the portions of sheets 10 and 11 which are dished to form the gasifying device leaving a slight space between these sheets 10 and 11 which aids in gasifying the oil.

In starting an engine equipped with my gasifying device a small quantity of gasolene or other light oil is used to prime the engine, that is to heat up the engine, this gasolene being supplied in the usual way no gasolene tank being necessary. As soon as the cylinder is heated by one or two explosions the heavy oil and air supplied to the intake port from the carbureter is gasified by the gasifying device 9 which becomes highly heated from the explosion of the charge in the cylinder, the oil and air passing through the perforations being at the same time subdivided and highly heated so that it is converted into an explosive mixture. After the gasifying device is once heated up it continues to be heated by the explosions in the cylinder.

While I do not desire to be limited to the use of copper as the material for the gasifying device I prefer this material as it is a good conductor of heat, becomes heated quickly, retains its heat well and is not changed in form or otherwise by the heat of the combustion chamber. It is also adapted to be readily dished or beaten to the form required for the gasifying device, and it is also particularly adapted for use as a gasket. The perforations in the sheet forming the gasifying device may be of any size desired but should not be so small as to be readily choked by the heavy oil.

Having thus described my invention what I claim is:

1. In an explosion engine a cylinder body and a removable head adapted to form a combustion chamber therefor, the cylinder body having an intake port formed therein opening into the combustion chamber, means for supplying oil and air to the intake port, and a gasifying device comprising a plate of metal arranged to serve as a gasket between the cylinder body and the removable head having the portion thereof over the intake port dished and perforated to permit the oil and air to pass through it into the combustion chamber.

2. In an explosion engine a cylinder body and a removable head adapted to form a combustion chamber therefor, the cylinder body having an intake port formed therein opening into the combustion chamber, means for supplying oil and air to the intake port, and a gasifying device comprising a plate formed of two sheets of metal having a space between them, arranged to serve as a gasket between the cylinder body and the removable head, the portions of the sheets over the intake port being dished and perforated to permit the oil and air to pass through them into the combustion chamber.

3. In an explosion engine a cylinder body having a plurality of cylinders formed therein and a removable head provided with a plurality of recesses each adapted to form a combustion chamber for a cylinder, the cylinder body having an intake port and exhaust port for each cylinder formed therein opening into a combustion chamber, means for supplying oil and air to the intake ports, and a plate adapted to serve as a gasket between the cylinder body and the removable head having the portions thereof over the cylinders and exhaust ports cut out and having the portions thereof over the intake ports dished and perforated to permit the oil and air to pass through them and to serve to convert the oil and air into an explosive mixture.

In testimony whereof I affix my signature.

ERNEST RABA.